United States Patent
Kallur et al.

(10) Patent No.: US 9,722,229 B2
(45) Date of Patent: Aug. 1, 2017

(54) ELECTRIC VEHICLE BATTERY ATTACHMENT ASSEMBLY AND METHOD

(71) Applicant: Ford Global Technologies, LLC, Dearborn, MI (US)

(72) Inventors: Vineeth Seshadri Kallur, Novi, MI (US); Hari Addanki, Novi, MI (US); Brian Utley, Canton, MI (US); Steve F. Chorian, Canton, MI (US); Debbi Callicoat, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 657 days.

(21) Appl. No.: 14/032,516

(22) Filed: Sep. 20, 2013

(65) Prior Publication Data

US 2015/0086833 A1    Mar. 26, 2015

(51) Int. Cl.
*H01M 2/20* (2006.01)
*H01M 2/30* (2006.01)

(52) U.S. Cl.
CPC .......... *H01M 2/206* (2013.01); *H01M 2/305* (2013.01); *H01M 2220/20* (2013.01); *Y10T 29/49204* (2015.01)

(58) Field of Classification Search
CPC .. H01M 2220/20; H01M 2/206; H01M 2/305; H01M 2/202; H01M 2/06; H01M 2/30; Y10T 29/49204
See application file for complete search history.

(56) References Cited

U.S. PATENT DOCUMENTS

| | | |
|---|---|---|
| 6,330,925 B1 | 12/2001 | Ovshinsky et al. |
| 8,313,855 B2 | 11/2012 | Muis |
| 2006/0216567 A1* | 9/2006 | England ............... H01M 8/0208 429/469 |
| 2006/0267545 A1* | 11/2006 | Lee ....................... H01M 2/1061 320/106 |
| 2010/0288532 A1* | 11/2010 | Ikeda .................... H01M 2/204 174/133 B |
| 2011/0045329 A1* | 2/2011 | Ikeda .................... H01M 2/206 429/91 |
| 2011/0052970 A1* | 3/2011 | Kurata ................... H01M 2/22 429/158 |
| 2011/0092111 A1* | 4/2011 | Tsuchiya ............... H01M 2/202 439/765 |
| 2012/0183840 A1 | 7/2012 | Lee et al. |
| 2013/0012079 A1 | 1/2013 | Sakae et al. |
| 2013/0029206 A1 | 1/2013 | Lev |

OTHER PUBLICATIONS

Ralf Schmid; Electrical Vehicle Batteries Made in Europe; Nov. 30, 2010; pp. 1-14.

* cited by examiner

*Primary Examiner* — Milton I Cano
*Assistant Examiner* — Ling R Zeng
(74) *Attorney, Agent, or Firm* — Carlson, Gaskey & Olds, P.C.

(57) ABSTRACT

An example method of connecting an electric vehicle battery includes welding a landing of a terminal to a bus bar, and pressing a landing of the terminal and the bus bar against one another during the welding. The landing is along a first plane and a base of the terminal is along a second plane that is spaced from the first plane.

20 Claims, 4 Drawing Sheets

ELECTRIC VEHICLE BATTERY ATTACHMENT ASSEMBLY AND METHOD

BACKGROUND

This disclosure relates generally to an electric vehicle battery and, more particularly, to electrically connecting bus bars to terminals of the electric vehicle battery.

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), and battery electric vehicles (BEVs). Electric vehicles are typically equipped with a battery pack containing multiple battery cells that store electrical power for powering the electric machine. The battery cells may be charged prior to use, and recharged during drive by a regeneration brake or engine.

Bus bars are often used to electrically connect the battery cells of the battery pack. Securing the bus bars using threaded connections, such as bolts and nuts, is time consuming because of the large number of connections required and the time required to secure a nut to a threaded stud or bolt. Automating the assembly of threaded studs is often difficult due to assembly tolerance stack ups. Further, over-torquing and cross-threading can damage the threaded connections.

SUMMARY

A method of connecting an electric vehicle battery according to an exemplary aspect of the present disclosure includes, among other things, welding a landing of a terminal to a bus bar, and pressing a landing of the terminal and the bus bar against one another during the welding. The landing is along a first plane and a base of the terminal is along a second plane that is spaced from the first plane.

In a further non-limiting embodiment of the foregoing method, the method includes securing the terminal to a current collector associated with a battery.

In a further non-limiting embodiment of any of the foregoing methods, the method includes supporting the landing with a step during the pressing.

In a further non-limiting embodiment of any of the foregoing methods, the step comprises a step of a terminal holder.

In a further non-limiting embodiment of any of the foregoing methods, the welding comprises laser welding.

In a further non-limiting embodiment of any of the foregoing methods, the welding generates lap joints.

In a further non-limiting embodiment of any of the foregoing methods, the method includes communicating air through an open area under the landing to remove thermal energy generated during the welding.

An electric vehicle battery assembly according to an exemplary aspect of the present disclosure includes, among other things, a terminal, a bus bar, a laser welded lap joint securing the bus bar to the terminal.

In a further non-limiting embodiment of the foregoing electric vehicle battery assembly, the terminal comprises a landing and a base, the landing of the terminal secured to the bus bar, and a base of the terminal secured to a current collector of a battery cell. The landing is along a first plane and the base is along a second plane that is spaced from the first plane.

In a further non-limiting embodiment of any of the foregoing electric vehicle battery assemblies, the assembly includes a step to support the landing of the terminal.

In a further non-limiting embodiment of any of the foregoing electric vehicle battery assemblies, the step is formed in a terminal holder.

In a further non-limiting embodiment of any of the foregoing electric vehicle battery assemblies, the landing is spaced from a terminal holder to provide an open area under the landing.

In a further non-limiting embodiment of any of the foregoing electric vehicle battery assemblies, the landing is planar.

A battery terminal according to an exemplary aspect of the present disclosure includes, among other things, a landing that secures a battery terminal to a bus bar, and a base that secures the battery terminal to a current collector of a battery cell. The landing is along a first plane and the base is along a second plane that is spaced from the first plane.

In a further non-limiting embodiment of the foregoing battery terminal, the terminal includes a step to support the landing of the terminal.

In a further non-limiting embodiment of any of the foregoing battery terminals, the step is formed in a terminal holder.

In a further non-limiting embodiment of any of the foregoing battery terminals, the landing is spaced from a current collector to provide an open area under the landing.

In a further non-limiting embodiment of any of the foregoing battery terminals, the landing is secured to the bus bar with a laser welded lap joint.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
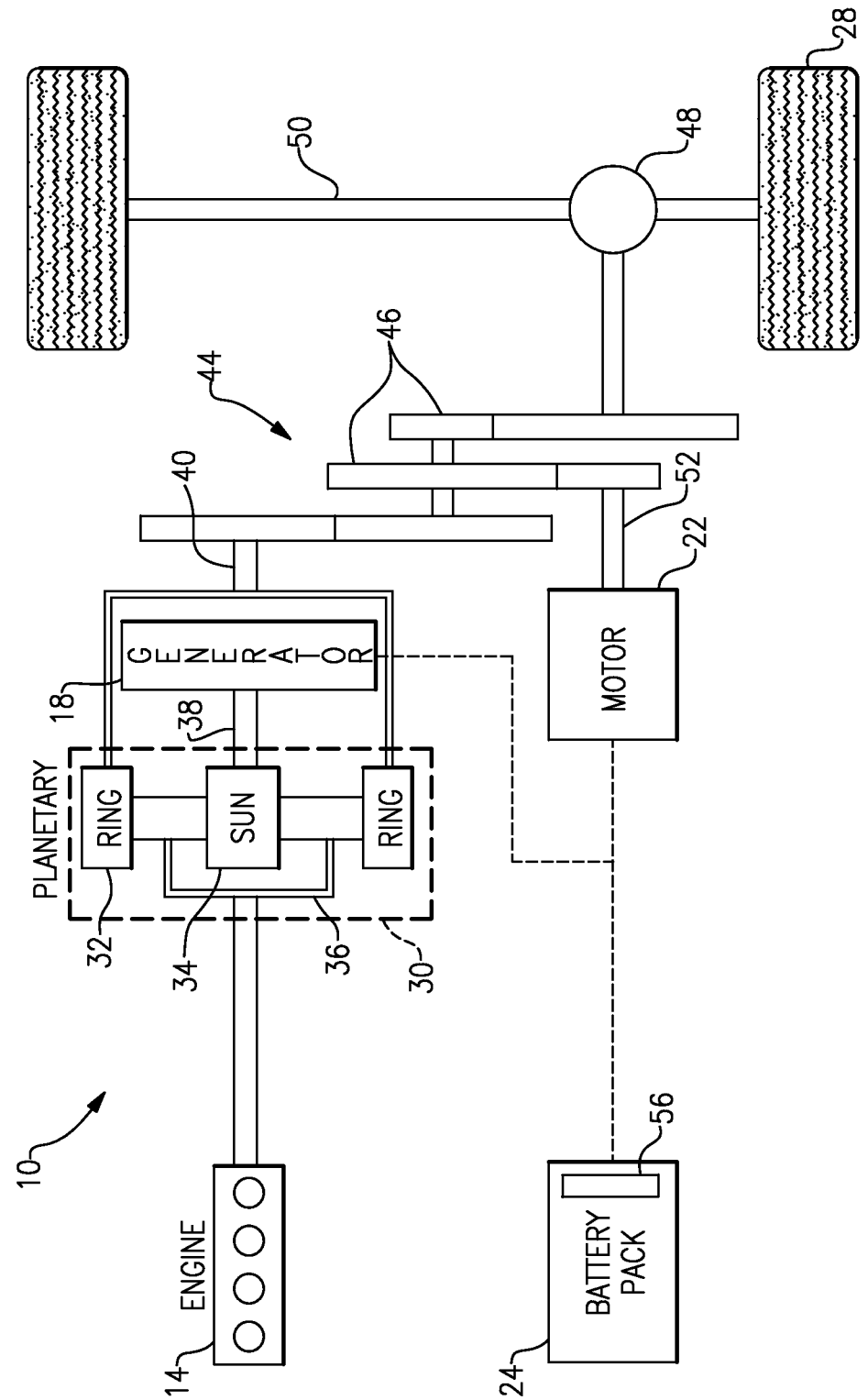
FIG. 1 illustrates a schematic view of an example electric vehicle powertrain.

FIG. 1 schematically illustrates a powertrain 10 for an electric vehicle. Although depicted as a hybrid electric vehicle (HEV), it should be understood that the concepts described herein are not limited to HEVs and could extend to other electrified vehicles, including but not limited to, plug-in hybrid electric vehicles (PHEVs) and battery electric vehicles (BEVs).

In one embodiment, the powertrain 10 is a powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electric vehicle.

The engine 14, which is an internal combustion engine in this example, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 may be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24 through a bus bar 56.

The battery pack 24 is an example type of electric vehicle battery assembly. The battery pack 24 may be a high voltage battery that is capable of outputting electrical power to operate the motor 22 and the generator 18. Other types of energy storage devices and/or output devices can also be used with the electric vehicle.

Figure 2:
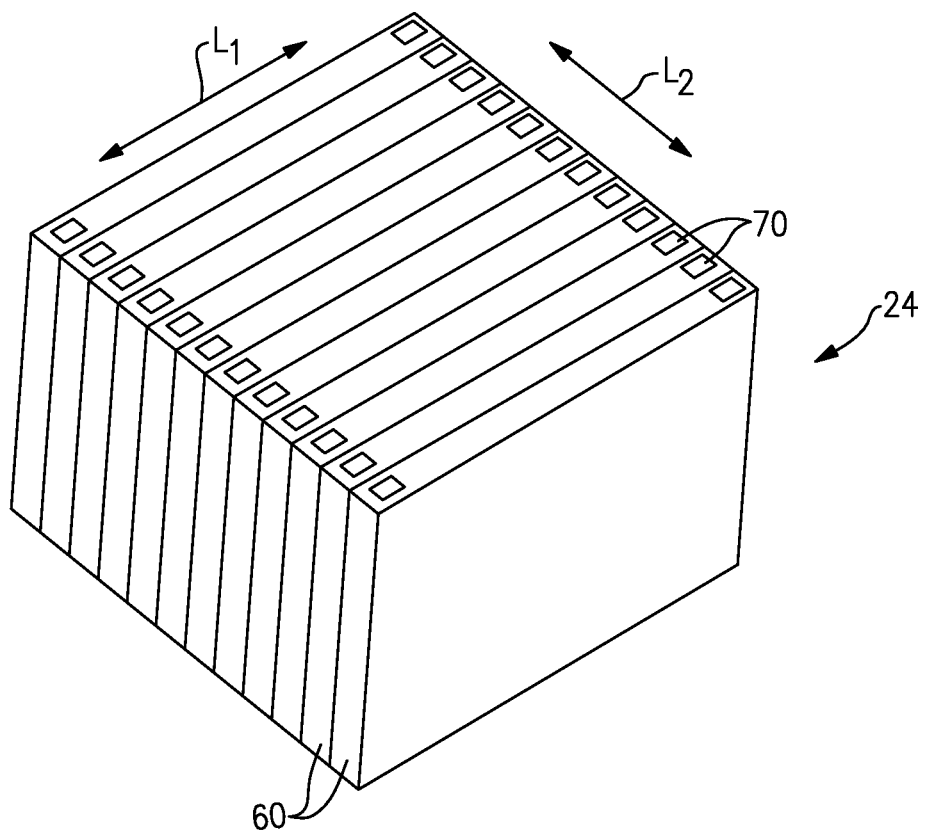
FIG. 2 illustrates a highly schematic perspective view of an example battery pack within the electric vehicle powertrain of FIG. 1.
Figure 3:
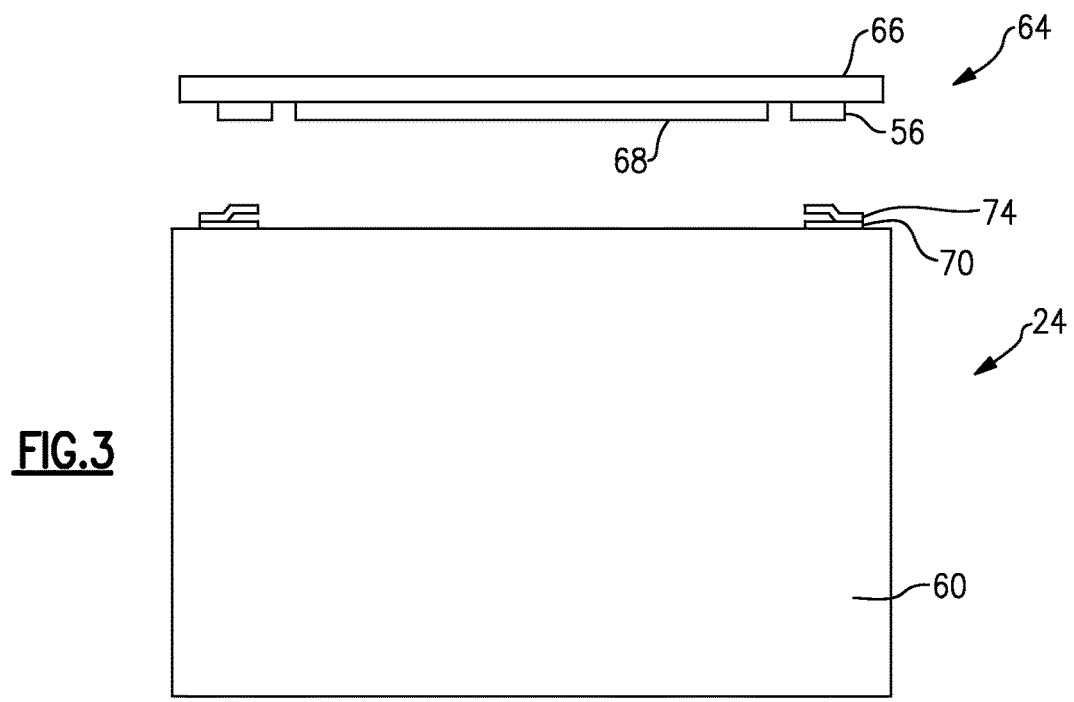
FIG. 3 illustrates a highly schematic side view of the battery pack of FIG. 2 and a bus bar module.

Referring now to FIGS. 2 and 3, the battery pack 24 includes a plurality of battery cells 60. The battery cells 60 store power. The bus bar 56 electrically couples the plurality of battery cells 60 together. Power is selectively communicated away from the battery cells 60 and used to drive the motor 22.

The bus bar 56 electrically couples the battery cells 60 to each other. The example bus bar 56 is a relatively high voltage bus that is also in electrical communication with the motor 22 and generator 18.

The bus bar 56 is part of a bus bar module 64. Within the bus bar module 64, the bus bar 56 is held between a first cover 66 and a second cover 68. The covers are a polymer material, in this example, and the bus bar 56 is a metallic, conductive material.

The battery cells 60 are prismatic cells in this example. The battery cells 60 each include a current collector 70. Current moves to and from the battery cells 60 through the current collectors 70.

A terminal 74 is secured directly to the current collector 70. A terminal holder 78 extends about a perimeter of the terminal 74. The terminal holder 78 protects the terminal 74.

Figure 4:
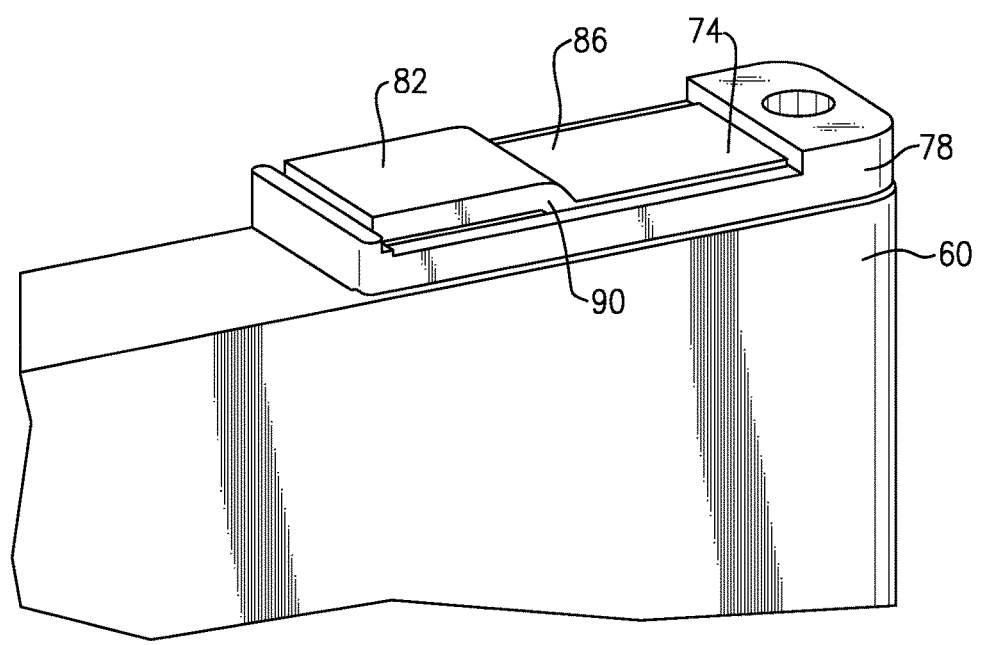
FIG. 4 illustrates a perspective view of a terminal mounted to a current connector of the battery pack of FIG. 2.
Figure 5:
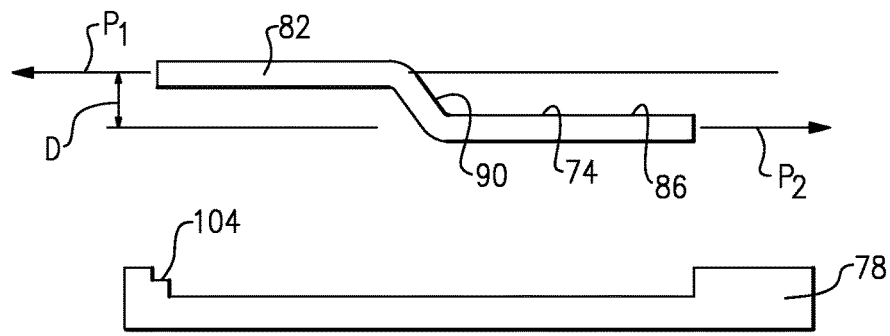
FIG. 5 illustrates an exploded side view of the terminal of FIG. 4.
Figure 6:
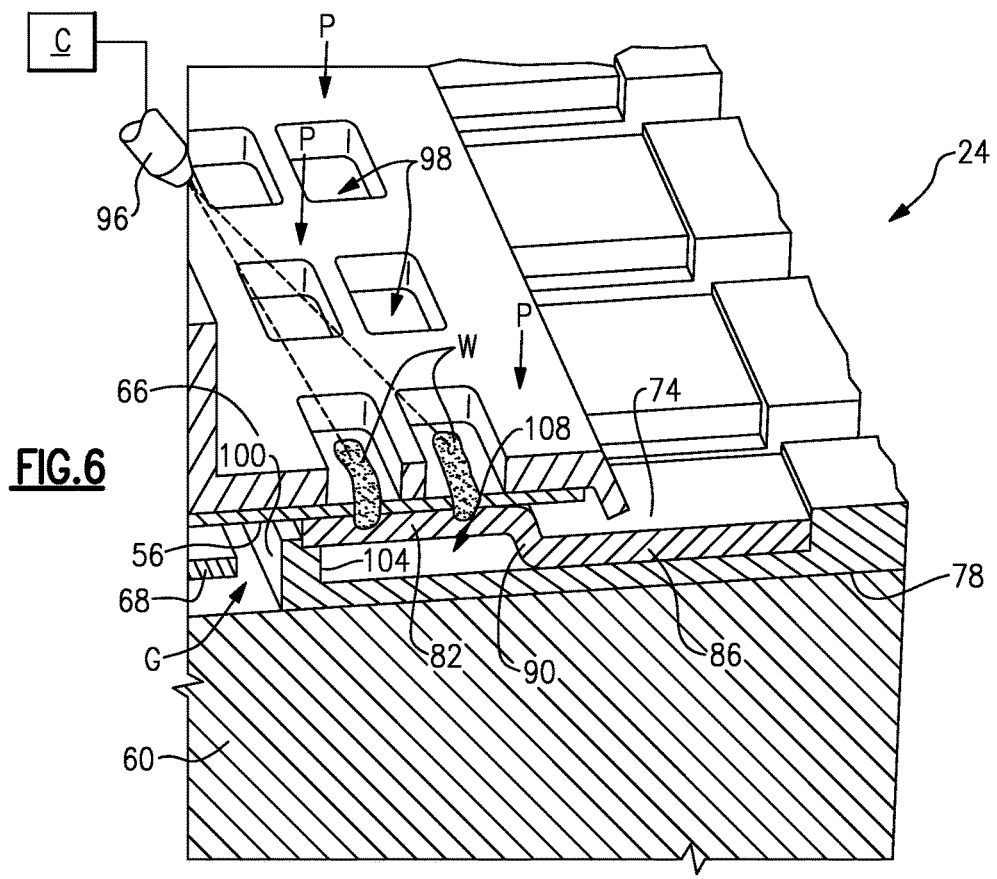
FIG. 6 illustrates a perspective sectional view of the battery pack and bus bar module of FIG. 3.

Referring now to FIGS. 4-6 with continuing reference to FIGS. 2 and 3, the example terminal 74 includes a landing 82 and a base 86. A connector portion 90 joins the landing 82 to the base 86. The connector portion 90 is curved to transition and join the landing 82 to the base 86. The landing 82 is the portion of the terminal 74 that is secured to the bus bar 56 of the bus bar module 72. The base 86 is the portion of the terminal 74 that is secured to the current collector 70.

The landing 82 is aligned along a first plane $P_1$. The base 86 is aligned along a second plane $P_2$. The first plane $P_1$ is spaced a distance D from the second plane $P_2$. In this example, the first plane $P_1$ is spaced vertically from the second plane $P_2$. The distance D between $P_1$ and $P_2$ allows space for the first cover 66 to extend down and around the bus bar 56, which can help retain the bus bar 56.

In this example, a welder 96 is used to weld the bus bar 56 directly to the landing 82 of the terminal 74 at welds W. A controller C is connected to the welder 96 and manipulates the position of the welder 96 to correctly position the welds W.

The welds W secure the bus bar 56, and the bus bar module 64, relative to the current collector 70. The terminals 74 for each of the battery cells 60 within the battery pack 24 are welded to a portion of the bus bar 56. Thus, several separate welds are used to secure the bus bar 56 to the battery pack 24. The first cover 66 includes windows 98 to provide access for the welder 96 to weld the bus bar 56 to the terminal 74.

The windows 98, in the example, are sized appropriately to provide access for the welder 96 to weld the bus bar 56 to the terminal 74 while limiting human access (finger touch) to the high voltage at the bus bar 56.

The example welds W are laser welded lap joint welds. The welder 96 directs a laser beam toward the bus bar 56 to create the weld. The laser beam penetrates through the bus bar 56 to the landing 82 of terminal 74 to create the weld in this example.

The second cover 68 and front face 100 of the terminal holder 78 are designed to be spaced from each other across a gap G. The gap G, in this example, is designed to be small enough such that no additional lateral adjustments are needed. The size of the gap G effectively locates the bus bar 56 and bus bar module 64 to the terminal 74.

Figure 7:
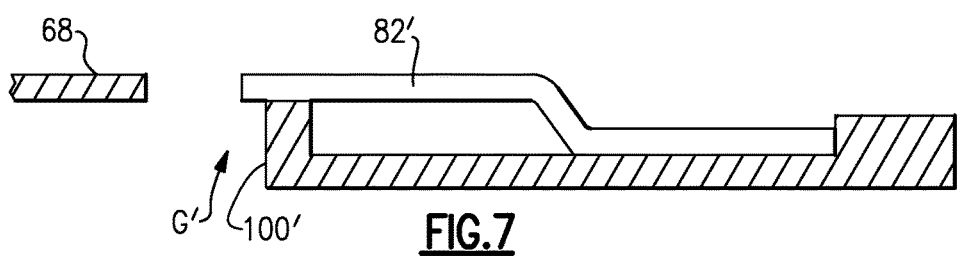
FIG. 7 illustrates a highly schematic side view of another example battery pack and the bus bar module.

In another example, a gap G' can be formed between the cover 68 of the bus bar module 64 and an edge of terminal landing 82' (FIG. 7) instead of the front face 100'. In such an example, the terminal landing 82' extends closer to the cover 68 than the front face 100'.

During welding, pressure P is applied to the bus bar module cover 66 to push the bus bar 56 and the landing 82 against one another. A clamp or weight can be used to apply the pressure P. A person having skill in this art and the benefit of this disclosure may be able to devise other ways to push the bus bar 56 and landing 82 against one another during the welding.

The example terminal holder 78 includes a step 104. When pressure P is applied, the landing 82 contacts the step 104. The step 104 thus prevents the landing 82 from deforming and moving away from the welding position.

An open area 108 beneath the landing 82 is open. During welding, thermal energy is moved away from the landing 82 and surrounding areas with air communicated through the open area 108. The step 104 limits movement of the terminal into the open area 108 when pressure P is applied during the welding.

Features of the disclosed examples include a terminal having a spaced arrangement between a landing and a base. The terminal can be secured to the bus bar with a laser beam lap joint weld. The spaced arrangement, a step support, and an open circulation area facilitate robust weld formation.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of connecting an electric vehicle battery, comprising:
    welding a landing of a terminal to a bus bar;
    pressing the landing of the terminal and the bus bar against one another during the welding, the landing along a first plane and a base of the terminal along a second plane that is spaced from the first plane; and
    supporting the landing during the pressing with a step that directly contacts the landing to limit movement of the landing into a gap between the landing and a surface of a battery cell.

2. The method of claim 1, further comprising securing the terminal to a current collector outside of the battery cell.

3. The method of claim 1, wherein the pressing is along an axis A toward the battery cell, and the step comprises a step of a terminal holder that axially overlaps at least a portion of the gap.

4. The method of claim 1, wherein the welding comprises laser welding.

5. The method of claim 4, wherein the welding generates lap joints.

6. The method of claim 1, further comprising communicating air through the gap to remove thermal energy generated during the welding.

7. An electric vehicle battery assembly, comprising:
    a terminal having a base and a landing, the base secured to a current collector that extends to the base through a side of a battery cell;
    a bus bar;
    a welded joint securing the bus bar to the landing, the landing spaced from the side to provide a gap between the side and the welded joint.

8. The battery assembly of claim 7, wherein the landing is along a first plane and the base is along a second plane that is spaced along an axis from the first plane to provide the gap,
    the landing additionally spaced radially from the base relative to the axis such that the base is secured to the current collector at a position that is axially misaligned with the entire welded joint.

9. The battery assembly of claim 7, further comprising a step to directly support and contact the landing of the terminal.

10. The battery assembly of claim 9, wherein the step is formed in a terminal holder that is outside the battery cell.

11. A battery terminal, comprising:
    a landing that secures a battery terminal to a bus bar, the landing welded to the bus bar through an opening in a bus bar cover; and
    a base that secures the battery terminal to a current collector of a battery cell, wherein the landing is along a first plane and the base is along a second plane that is spaced from the first plane to provide a gap between the landing and the battery cell.

12. The battery terminal of claim 11, including a step that directly supports and contacts a first end of the landing, and a connector portion that extends from an opposite, second end of the landing to connect the landing to the base.

13. The battery terminal of claim 11, wherein the step is formed in a terminal holder.

14. The battery terminal of claim 11, wherein the landing is secured to the bus bar with a laser welded lap joint.

15. The method of claim 1, further comprising welding the landing to the bus bar through windows in a cover of the bus bar, and locating the bus bar relative to the terminal using the cover.

16. The method of claim 15, wherein the cover extends from a first surface of the bus bar past an opposing, second surface of the bus bar, the second surface directly contacting the landing during the welding.

17. The battery assembly of claim 10, wherein the terminal holder extends from a first position laterally outside the terminal to a second position laterally inside the terminal, wherein the entire base is laterally outside the entire landing.

18. The battery terminal of claim 13, wherein the landing includes a first surface facing downwardly toward the battery cells, and a second surface facing laterally inward toward a median of the battery cells, the first surface transverse to the second surface, wherein the step directly contacts the first surface to support the landing during welding, and the terminal holder extends past the first surface to interface with the second surface, wherein the base is laterally outside of the landing.

19. The battery assembly of claim 7, wherein the welded joint is a laser welded lap joint.

20. The battery assembly of claim 7, wherein the base is secured to the current collector at a position outside the battery cell.

* * * * *

UNITED STATES PATENT AND TRADEMARK OFFICE
CERTIFICATE OF CORRECTION

PATENT NO. : 9,722,229 B2  
APPLICATION NO. : 14/032516  
DATED : August 1, 2017  
INVENTOR(S) : Vineeth Seshadri Kallur et al.

Page 1 of 1

It is certified that error appears in the above-identified patent and that said Letters Patent is hereby corrected as shown below:

In the Claims

In Claim 13, Column 6, Line 27; after "battery terminal of" replace "claim 11" with --claim 12--

In Claim 18, Column 6, Line 45; before "and a second" replace "cells," with --cell,--

In Claim 18, Column 6, Line 46; before "the first surface" replace "battery cells," with --battery cell,--

Signed and Sealed this  
Fourteenth Day of November, 2017

Joseph Matal  
*Performing the Functions and Duties of the*  
*Under Secretary of Commerce for Intellectual Property and*  
*Director of the United States Patent and Trademark Office*